Nov. 17, 1959 J. J. NEWMAN 2,913,537

MAGNETIC RECORDING

Filed April 30, 1956 2 Sheets-Sheet 1

INVENTOR.
JAY J. NEWMAN
BY Morris A. Pabkin
ATTORNEY

Nov. 17, 1959 J. J. NEWMAN 2,913,537

MAGNETIC RECORDING

Filed April 30, 1956 2 Sheets-Sheet 2

INVENTOR.
JAY J. NEWMAN
BY Morris A. Rabkin
ATTORNEY

United States Patent Office 2,913,537

Patented Nov. 17, 1959

2,913,537

MAGNETIC RECORDING

Jay J. Newman, Westmont, N.J., assignor to Radio Corporation of America, a corporation of Delaware Application April 30, 1956, Serial No. 581,782

6 Claims. (Cl. 179—100.2)

This invention relates to magnetic recording and reproducing, and more particularly to interlock control means which are adapted to cooperate with a record medium transport mechanism suitable for use in a magnetic recording and reproducing system.

The present invention, briefly described, includes a mechanism which may be cooperatively associated with commercially available transport mechanisms used in magnetic recording apparatus, such as tape recorders. The mechanism provided by the invention is effective as an interlock which controls the operation of the transport mechanism in accordance with the condition of operation of the recording apparatus and the type of record holding reel used therewith.

As recordings are made with most commercially available magnetic recording and reproducing apparatus, previously recorded information on the record member is obliterated or erased. If the previously recorded information is relatively trivial or of no lasting value, the obliteration of such a record would be of slight importance. However, if the previously recorded information is of lasting value, the obliteration would be highly undesirable. Such erased records may be either irreplaceable, or at best replaceable only at considerable expense. There are presently available, prerecorded magnetic tape records of high quality musical selections, lectures, and the like. It has become popular to purchase such prerecorded tape records so that such records may be reproduced or played back on the purchaser's magnetic tape recorder. The present invention is designed to prevent inadvertent erasure or obliteration of such records of lasting value. Heretofore, proposals have been made for providing equipment which would tend to minimize the likelihood that selected records would be inadvertently erased. Such previous proposals have either involved complex equipment which is inconsistent with present standard commercially available recording equipment or is not sufficiently foolproof.

It is, accordingly, an object of the present invention to provide an improved magnetic recording-reproducing apparatus which will prevent the inadvertent obliteration or erasure of recordings that are desired to be retained, such as prerecorded tape records, and which obviates the foregoing difficulties.

It is another object of the present invention to provide improved means for preventing the inadvertent obliteration or erasure of recordings that are desired to be retained, such as prerecorded records, which is characterized in simplicity of structure and operation.

In accomplishing these and other objects there has been provided, in accordance with the present invention, magnetic recording and reproducing apparatus wherein the operation of the record function control member is prevented whenever a special reel holding a valued record is positioned on the apparatus. This special reel is a slightly modified standard reel. Mechanism is associated with the spindle on the apparatus for receiving the reel which senses the special or modified reel. This mechanism is also adapted to interlock with a movable member coupled to the record function control member when a modified reel is placed on the apparatus. In the interlocked position, the operation of the record function control member is prevented. However, the operation of the record function control member is not disturbed whenever a standard reel bearing an ordinary record tape is placed on the apparatus.

Other objects and advantages of the present invention will, of course, become apparent and immediately suggest themselves to those skilled in the art to which the invention is directed from a reading of the following specification in connection with the accompanying drawing, in which.

Figure 1:
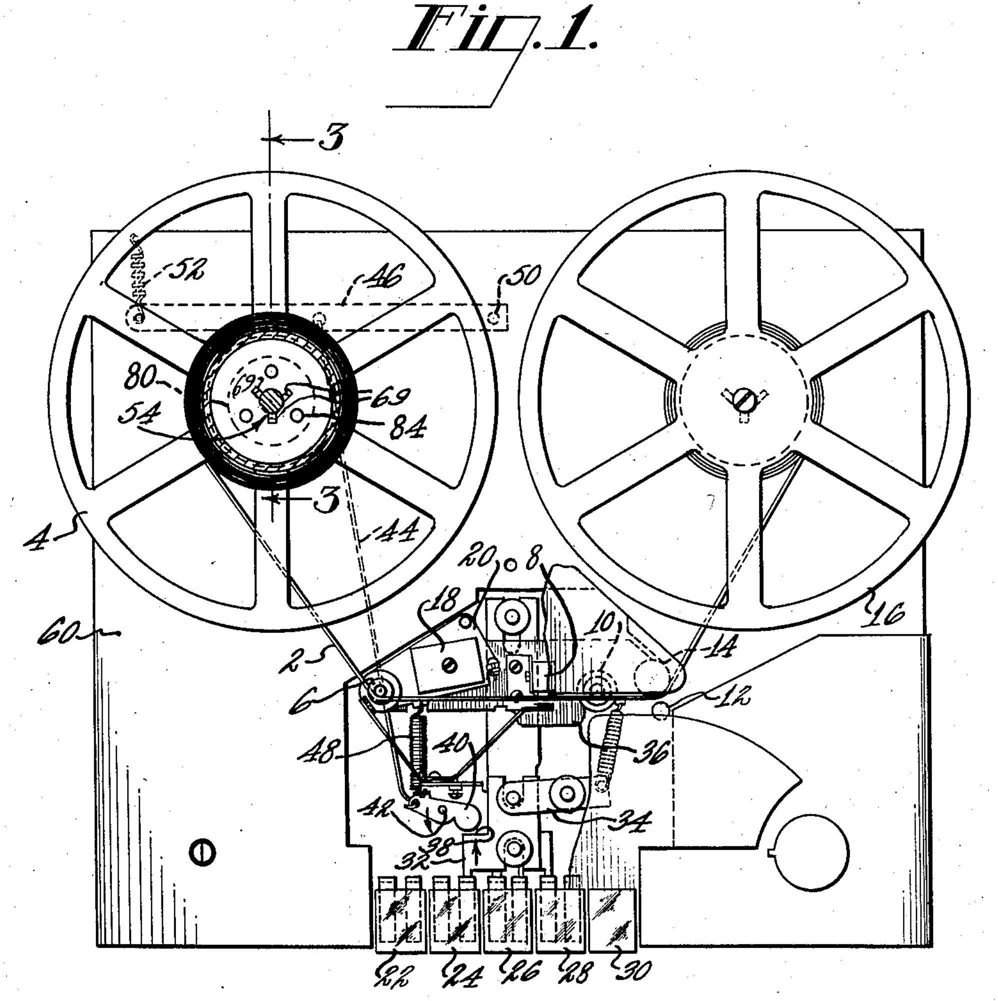
Fig. 1 is a plan view, partially in section and partially broken away, of a magnetic recording-reproducing apparatus embodying the present invention and showing the apparatus as it would be positioned to prevent inadvertent erasure of a recording which it is desired to retain, such as a prerecorded tape, the tape being mounted on a reel designed in accordance with the invention.
Figure 2:
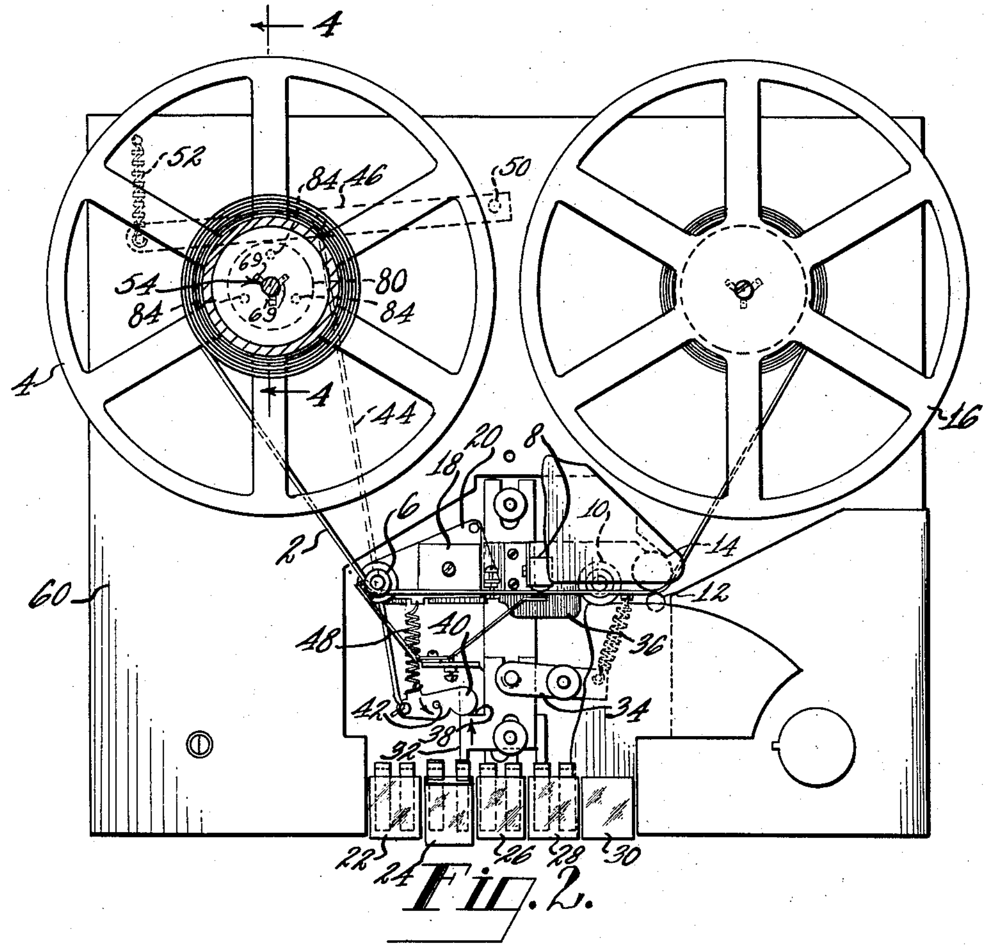
Fig. 2 is a view similar to Fig. 1 but showing the apparatus as used with an ordinary reel.

Referring now to the drawing in more detail, and particularly to Figs. 1 and 2 thereof, there is shown a magnetic recording-reproducing apparatus in which a magnetic record tape 2 is fed from a storage or supply reel 4 along a path around a guide post 6, past a transducer 8, past a second guide post 10, and between a capstan 12 together with its associated pressure roller 14 to a take-up reel 16. Adjacent to the path of the tape 2 between the first guide post 6 and the capstan 12 there is positioned a selectively operable erase head 18 which may be in the form of a permanent magnet or a suitably energized electromagnet. In the illustrative embodiment, this erase head is mounted on a movable plate member 20. This plate is pivotally mounted for movement about the guide post 6.

In order to control the various functions of the apparatus, suitable control members are provided. In the illustrative example, these control members are represented as push buttons, five such push buttons being shown. The first push button 22 may, for example, be coupled to parts of the apparatus providing for fast rewind. The next push button 24, in the illustrative example, may be used to condition the apparatus to record. The middle button 26 is a stop control button which disengages the transducer and the drive mechanism from the tape and applies brakes (not shown) to the reel spindles. The next adjacent push button 28 may be used to condition the apparatus to reproduce recorded signals; while the last push button 30 may be used to condition the apparatus to drive the tape in a fast forward direction.

The several push buttons are coupled through suitable linkages to control elements which are moved to effect the various controls corresponding to the operation of the several push buttons. For example, when the record function push button 24 is depressed a slide plate 32 is caused to move in a direction indicated by the arrow thereon. The movement of this slide plate 32 in the direction indicated by the arrow causes a first pivot arm 34 to be rotated upon its pivot to pull a main transducer mounting plate 36 into a position whereat the transducer 8 engages the tape 2, and the pressure roller 14 presses the tape 2 against the capstan 12.

A shoulder 38 on the plate 32 engages one end of a second pivot arm 40. The pivot arm 40 is mounted for movement about a stud 42. The end of the arm 40 remote from that portion which engages the shoulder 38 and the plate 32 is connected by a link 44 to a blade or lever 46.

The same end of the pivot arm 40 which carries the link 44 is also coupled by a relatively stiff spring 48 to the erase head plate 20. Thus, when the push button 24 is depressed causing the plate 32 to be moved in the direction indicated by the arrow thereon, the arm 40 is caused to rotate about its axis in the direction indicated by the arrow associated therewith. The rotation of the arm 40 moves the plate 20 to a position where the erase head engages the tape as shown in Fig. 2. This motion of the arm 40 also causes the blade 46 to be moved about its pivot 50 against the force of a restoring spring 52 and toward the spindle 54 of the supply reel 4. This is the condition of operation illustrated in Fig. 2 of the drawings. With the apparatus in this condition of operation, information which has previously been recorded on the tape will be erased by the passage of the tape past the erase head and new information will be recorded in accordance with whatever information is fed to the input of the apparatus. A valuable record, at least in part, would be obliterated if it is inadvertently placed on the apparatus with the apparatus set to operate in the condition illustrated in Fig. 2.

To prevent such an occurrence, the spindle of the supply reel is provided with means for sensing a reel designed in accordance with the invention when such a reel is placed thereon. The recording function of the apparatus is disabled by mechanism cooperating with the sensing means. The spindle assembly for the supply reel, as indicated in greater detail in Figs. 3 and 4, includes a reel spindle drive shaft 56 which extends through a bearing 58 mounted in the mounting panel 60. A suitable well or depression 62 is provided in the mounting panel 60 to receive the spindle assembly. Mounted on and keyed to the drive shaft 56 is a main spindle body 54. The spindle body includes a disk-like flange 66 which extends in a plane parallel to and slightly above the plane of the mounting panel 60. A center post 68, which extends upwardly from the disk-like flange 66 and surrounds the supper end of the drive shaft 56, is also included in the spindle body. Three equally spaced keys 69 are formed near the bottom of the center post 68. These keys 69 fit into keyways provided around the center hole in the hub of the reel so as to position and lock the reel for rotation with the center post 68.

Depending from the disk-like flange 66 there is a spool or collar portion 70 which is provided at its lower end with a radially extending lip or flange 72. A compression spring 74 surrounds the spool portion of the spindle assembly and one end of the spring rests against and is restrained by the flange 72. A floating collar 76 is positioned surrounding the spool portion and is provided with a shoulder 78 which engages the opposite end of the spring 74 from that engaged by the flange 72. A cylindrical portion 80 of the floating collar 76 connects the shoulder portion thereof with a radial flange 82. This radial flange 82 is held in a plane which is parallel to the disk portion 66 of the spindle assembly but which lies below the plane of the mounting panel 60.

Figures 3, 4:
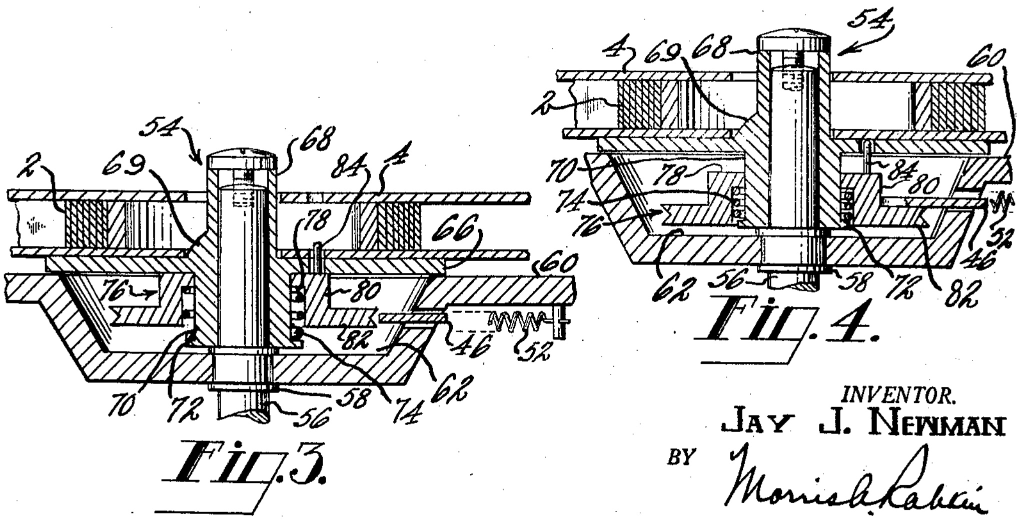
Fig. 3 is a fragmentary cross-sectional view, on an enlarged scale, taken along the line 3—3 of Fig. 1 as viewed in the direction of the arrows.
Fig. 4 is a fragmentary cross-sectional view, on an enlarged scale, taken along the line 4—4 of Fig. 2 as viewed in the direction of the arrows.

The upper surface of the shoulder portion of the floating collar 76 is pressed against the under surface of the disk 66. This upper surface carries a plurality of sensing pins 84 which protrude through corresponding openings in the disk 66. Three such pins are illustrated. The sensing pins 84 and openings in the disk may be observed to be located in definte positions with respect to the keys 69 on the center post 68. Each of the pins 84, in the illustrative embodiment shown in Figs. 1 and 2 of the drawing, approximately bisect the angle formed by a different pair of keys 69. When the floating collar 76 is in the position, as indicated in Fig. 3 of the drawing, the outer periphery of the radial flange 82 lies in the path of movement of the blade 46. Thus, the blade 46 is prevented from being moved sufficiently towards the axis of the spindle to allow the record function to be actuated. In accordance with the invention, the blade 46 and the flange 82 interlock when a modified reel bearing a prerecorded or other record which is desired to be retained is placed on the supply reel spindle so that it will be impossible to inadvertently erase such a record.

Referring to Fig. 3, it will be seen that the reel 4 shown as being positioned on the supply reel spindle 54 is provided with small holes through the hub which are positioned with respect to the keyways around the center hole in the hub of the reel to correspond with the location of the sensing pins 84. When a reel bearing these holes is properly placed on the spindle so that the keys 69 extend into the keyways of the reel, the sensing pins extend through the holes allowing the flange 82 to remain in the path of the blade 46. On the other hand, a reel without the holes, as shown in Fig. 4, when properly placed on the spindle engages the ends of the sensing pins 84. The foolproof nature of the mechanism of the invention is exhibited since it makes it impossible to place a special reel having the spaced holes therein in driving position on the center post 68 without permitting the sensing pins 84 to extend up through those holes in the reel. The spring 74 is designed so that the weight of the reel on the ends of these pins 84 cause the floating collar 76 to be depressed compressing the spring 74. This axial movement of the floating collar 76 removes the flange 82 from the path of the blade 46 allowing the record function to be actuated.

By the addition of the appropriate number of indicated holes through the hub for receiving the sensing pins 84 to an ordinary reel of tape, a record on the reel is protected against inadvertent erasure. With this arrangement, the protected record cannot be erased without first transferring the record member thereon to a different reel. On the other hand, there is no interference with the full functioning of the apparatus with respect to an ordinary reel.

There has thus been provided an improved magnetic recording-reproducing apparatus which will prevent the inadvertent erasure of prerecorded tapes, which is not inconsistent with present standard recording equipment, which is foolproof, and which is characterized by simplicity of structure and operation.

What is claimed is:

1. A magnetic recorder-reproducer comprising a tape reel holding spindle, record erasing means movable from record erasing position to an inactive position, interlocking means for preventing movement of said erasing means from said inactive position, a hand operated control member for said erasing means, said interlocking means comprising a locking member, linkage means operatively coupling said control member to said locking member, a movable sleeve member associated with said spindle, means to bias said sleeve member to a position preventing movement of said locking member, and means projecting from said sleeve member toward a tape reel positioned on said spindle whereby to move said sleeve member by tape reel engagement to a position permitting movement of said locking member, said projecting means also being positioned to avoid tape reel engagement by a reel provided with an aperture for receiving said projecting means.

2. A magnetic recording-reproducing apparatus for use with two types of reels, one of said reels being a standard reel and the other being a modified reel for special records, said apparatus comprising a reel spindle, sensing means associated with said spindle for sensing which one of said two types of reels is positioned on said spindle, said sensing means including a member movable by engagement with said standard reel between two positions, said member being positioned in one of said positions when said modified reel is disposed on said spindle and in the other of said positions when said standard reel is disposed on said spindle, movable control means for controlling the mode of operation of said apparatus whereby records associated therewith are obliterated, said control means being manually shiftable between two positions and being shifted into one of said positions when conditioned for said record obliteration mode of operation, and means for interlocking said sensing means and said control means for preventing the shifting of said control means to affect said mode of operation when said modified reel is positioned on said spindle and for permitting shifting of said control means when said standard reel is positioned on said spindle.

3. A magnetic recording-reproducing apparatus for use with either of two types of reels, one of said reels being a standard reel and the other being a modified reel for special records, said apparatus comprising a reel spindle, sensing means associated with said spindle for sensing which one of said two types of reels is positioned on said spindle, said sensing means including a member movable by engagement with said standard reel between two positions, said member being positioned in one of said two positions when said modified reel is disposed on said spindle and in the other of said two positions when said standard reel is disposed on said spindle, movable control means for controlling the recording operation of said apparatus, said control means being manually shiftable between two positions and being shifted into one of said two positions when conditioned for said recording operation, and a mechanical linkage coupled to said control means and adapted to interlock with said member for preventing the shifting of said control means to affect said recording operation when said modified reel is positioned on said spindle and for permitting the shifting of said control means when a standard reel is positioned on said spindle.

4. Magnetic recording-reproducing apparatus for use with two types of reels, one of said reels being a standard reel, the other of said reels being a modified reel adapted to hold special records, said apparatus comprising a reel spindle, key means disposed on said reel spindle for engaging a reel positioned on said spindle, sensing means associated with said spindle for sensing which of said two types of reels is positioned on said spindle in engagement with said key means thereon, said sensing means including at least one member disposed in a predetermined position with respect to said key means, said member being disposed for engagement with a standard reel positioned on said spindle for movement from a first to a second position, movable control means for controlling the operation of said apparatus including a manually actuable member adapted to condition said apparatus for record erasing operation when shifted into operating position, and means for interlocking said members for preventing the actuation of said manually actuable member in said control means into operating position only when said first named member is in said first position.

5. In a magnetic recording-reproducing apparatus arranged for use with either of two types of magnetic record storage reels, one of said types of reels being a standard reel, the other of said reels being a modified reel provided with a pin receiving hole in the hub portion thereof, the combination comprising a reel spindle, a reel supporting flange having an opening therein mounted on said spindle, sensing means associated with said spindle for sensing which one of said two types of reels is placed in operating position on said spindle, said sensing means including a collar positioned below said flange and having a pin extending through said opening, said collar being normally positioned with said pin extending beyond the surface of said flange, said pin and said collar being depressible by the positioning of a standard reel on said spindle, said pin being aligned with and passing through said hole in said modified reel when said modified reel is placed on said spindle in said operating position, control means including a movable linkage for controlling the recording operation of said apparatus, and lever means coupled to said movable linkage, said lever means being positioned to interlock with said collar when said collar is in said normal position to prevent the operation of said control means but being free of said collar when said collar is depressed by said standard reel.

6. In a magnetic recording-reproducing apparatus arranged for use with either of two types of magnetic record storage reels each having a hub portion, a center hole, and keyways communicating with said center hole, one of said reels being a standard reel, the other of said reels being a modified reel provided with a number of pin receiving holes in said hub portion thereof equal to the number of said keyways, said pin receiving holes being spaced in predetermined relation to said keyways, the combination comprising a reel spindle having mounted thereon a center post and a reel supporting flange, said center post having an arrangement of keys extending therefrom adapted to fit into said keyways when any one of said reels is placed in operating position on said center post, said flange having openings therein, sensing means associated with said spindle for sensing which one of said two types of reels is positioned on said spindle, said sensing means including a collar positioned below said flange and having a plurality of pins extending through said openings in said flange, said pins being spaced with respect to said keys to be aligned with said pin receiving holes, spring means normally biasing said collar into position against said flange with said pins extending above the surface of said flange, said pins and said collar being depressible over the bias of said spring means by the positioning of one of said standard reels on said center post, control means including a movable linkage for controlling the recording operation of said apparatus, and lever means coupled to said movable linkage, said lever means being positioned to interlock with said collar when said collar is in said normal position to prevent the operation of said control means but being positioned out of the way of said collar when said collar is depressed by said standard reel.

References Cited in the file of this patent

UNITED STATES PATENTS

| | | |
|---|---|---|
| 2,466,514 | Vogtborg | Apr. 5, 1949 |
| 2,572,596 | Camras | Oct. 23, 1951 |
| 2,594,848 | Begun | Apr. 29, 1952 |
| 2,612,565 | Heller | Sept. 30, 1952 |
| 2,617,890 | Barany et al. | Nov. 11, 1952 |
| 2,620,404 | Pond | Dec. 2, 1952 |
| 2,761,017 | Camras | Aug. 28, 1956 |